(12) United States Patent
Qu et al.

(10) Patent No.: US 11,443,347 B2
(45) Date of Patent: Sep. 13, 2022

(54) SYSTEM AND METHOD FOR CLICK-THROUGH RATE PREDICTION

(71) Applicant: Samsung Electronics Co., Ltd., Suwon-si (KR)

(72) Inventors: Xianshan Qu, Columbia, SC (US); Li Li, San Jose, CA (US); Xi Liu, College Station, TX (US); Rui Chen, Sunnyvale, CA (US); Yong Ge, Tucson, AZ (US); Soo-Hyun Choi, Sungnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 17/006,495

(22) Filed: Aug. 28, 2020

(65) Prior Publication Data

US 2021/0065251 A1     Mar. 4, 2021

Related U.S. Application Data

(60) Provisional application No. 62/894,681, filed on Aug. 30, 2019.

(51) Int. Cl.
*G06Q 30/00*     (2012.01)
*G06Q 30/02*     (2012.01)
*G06N 3/08*      (2006.01)

(52) U.S. Cl.
CPC ......... *G06Q 30/0275* (2013.01); *G06N 3/08* (2013.01); *G06Q 30/0244* (2013.01); *G06Q 30/0271* (2013.01); *G06Q 30/0276* (2013.01)

(58) Field of Classification Search
CPC ...................................................... G06N 3/08
See application file for complete search history.

(56) References Cited

U.S. PATENT DOCUMENTS

| | | |
|---|---|---|
| 2007/0112840 A1 | 5/2007 | Carson et al. |
| 2008/0249832 A1 | 10/2008 | Richardson et al. |
| 2015/0088788 A1 | 3/2015 | Traupman et al. |
| 2017/0099525 A1* | 4/2017 | Ray .................... H04N 21/4532 |
| 2018/0012251 A1 | 1/2018 | Du et al. |
| 2019/0080260 A1* | 3/2019 | Acuna Agost ..... G06Q 30/0275 |
| 2019/0114509 A1 | 4/2019 | Deng et al. |
| 2019/0114537 A1* | 4/2019 | Wesolowski .......... G06N 3/084 |
| 2019/0279236 A1 | 9/2019 | Fadli |
| 2021/0271973 A1* | 9/2021 | Zhang ..................... G06N 3/04 |
| 2021/0383115 A1* | 12/2021 | Alon ....................... A63F 13/77 |

OTHER PUBLICATIONS

Qu, et al. "A Dynamic Neural Network Model for Click-Through Rate Prediction in Real-Time Bidding", 2019 IEEE International Conference on Big Data (Big Data), Dec. 9-12, 2019, 10 Pages.

(Continued)

*Primary Examiner* — Alvin L Brown

(57) ABSTRACT

A system and method capable of learning dynamic user and advertisement behavior for more effective click-through rate prediction. The system and method include at least one processor configured to obtain at least one item data, wherein the at least one item data comprises at least one explicit feedback to a user interaction event and other data associated with an item. The at least one processor also uses an interaction model that incorporates the obtained at least one item data to generate a user response prediction for a user and another interaction event.

20 Claims, 9 Drawing Sheets

(56) References Cited

OTHER PUBLICATIONS

Cheng, et al. "Wide & Deep Learning for Recommender Systems", DLRS, 2016, Sep. 15, 2016, Boston, MA, USA, 4 pages.

Guo, et al. "DeepFM: A Factorization-Machine based Neural Network for CTR Prediction", Noah's Ark Research Lab, Huawei, Mar. 3, 2017, 8 pages.

Zhou, et al. "Deep Interest Network for Click-Through Rate Prediction" KDD '18: Proceedings of the 24th ACM SIGKDD International Conference on Knowledge Discovery & Data Mining, Sep. 13, 2018, 9 pages.

Brian Blondy, Total Media, "Publisher: When should you shift from Google AdSense to Google AdExchange?" Available at: https://www.totalmediasolutions.com/blog/publisher-when-should-you-shift-from-google-adsense-to-google-adexchange/, Jul. 3, 2014, 6 pages.

Google, "How Google shows you ads?" Available at: https://adssettings.google.com/whythisad, 1 page.

Zhang, et al. "Deep Learning over Multi-field Categorical Data—A Case Study on User Response Prediction" European Conference on Information Retrieval, ECIR 2016: Advances in Information Retrieval, Jan. 11, 2016, 12 pages.

Qu, et al. "Product-Based Neural Networks for User Response Prediction over Multi-Field Categorical Data", ACM Transactions on Information Systems, Article No. 5, Jul. 1, 2018, 35 pages.

\* cited by examiner

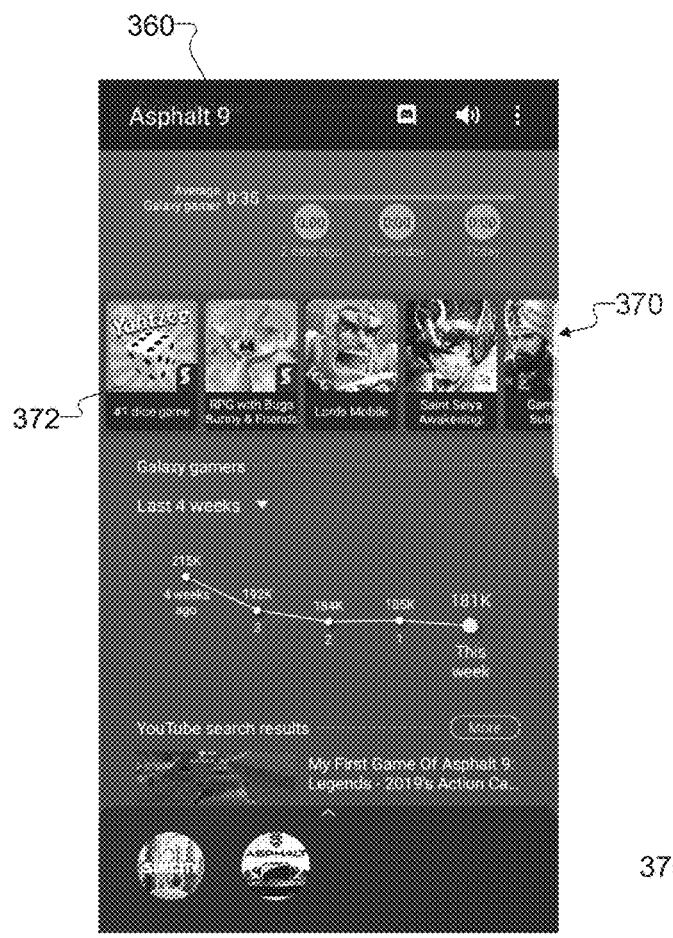
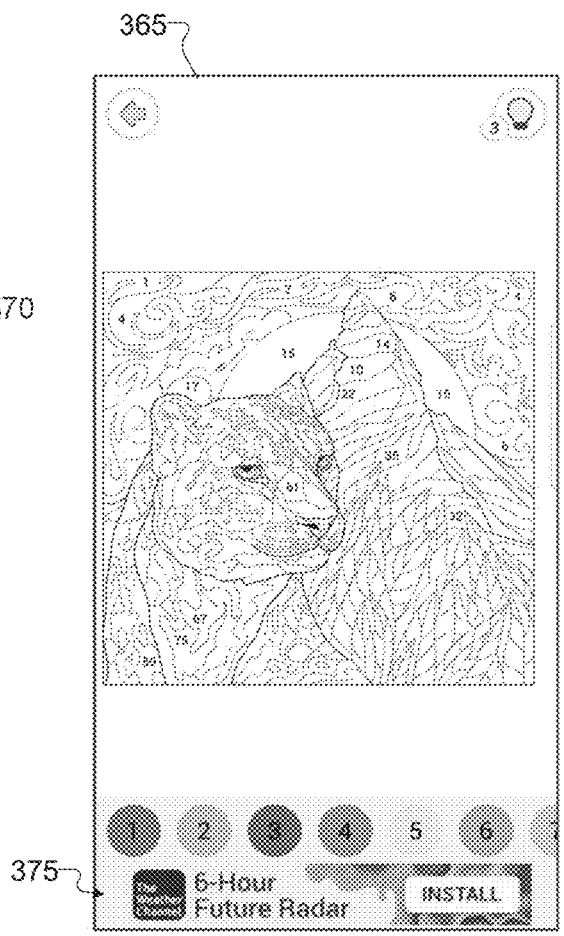
FIG. 3A
FIG. 3B

SYSTEM AND METHOD FOR CLICK-THROUGH RATE PREDICTION

CROSS-REFERENCE TO RELATED APPLICATIONS AND PRIORITY CLAIM

This application claims priority under 35 U.S.C. § 119(e) to U.S. Provisional Patent Application No. 62/894,681 filed on Aug. 30, 2019, which is hereby incorporated by reference in its entirety.

TECHNICAL FIELD

This disclosure relates generally to prediction systems. More specifically, this disclosure relates to techniques for learning dynamic user and advertisement behavior for more effective click-through rate prediction.

BACKGROUND

Real-time bidding (RTB) is a relatively new paradigm of digital advertising that appeared around 2005, which features per-impression-level real-time ad auctions. The past few years have witnessed a burgeoning growth of RTB. It is forecasted that the global RTB market size will further grow from $6.6 billion (US Dollars) in 2019 and will grow to $27.2 billion (USD) in 2024, at a compound annual growth rate of 32.9%. In RTB, performance-based advertising and brand-based advertising are the most common forms of advertising. Performance-based ads track and measure the performance of an ad campaign in terms of tangible user responses (e.g., clicks or conversions), while brand-based ads aim to simply promote awareness of large brands without the need of monitoring user responses.

Unfortunately, the RTB setting is substantially different from the sponsored advertising setting. For example, the underlying data in RTB is highly dynamic, making it difficult to make meaningful predictions. Solutions are needed to address these deficiencies.

SUMMARY

This disclosure provides techniques for modeling the dynamic evolutions of both users and advertisements.

In a first embodiment, a method includes obtaining, by an electronic device, at least one item data, wherein the at least one item data comprises at least one explicit feedback to a user interaction event and other data associated with an item. The method also includes generating, by the electronic device using an interaction model that incorporates the obtained at least one item data, a user response prediction for a user and another interaction event.

In a second embodiment, an electronic device includes at least one memory, and at least one processor operatively coupled to the at least one memory. The processor is configured to obtain at least one item data, wherein the at least one item data comprises at least one explicit feedback to a user interaction event and other data associated with an item. The processor also is configured to generate, using an interaction model that incorporates the obtained at least one item data, a user response prediction for a user and another interaction event.

In a third embodiment, a non-transitory machine-readable medium contains instructions that when executed cause at least one processor of an electronic device to obtain at least one item data, wherein the at least one item data comprises at least one explicit feedback to a user interaction event and other data associated with an item. The medium also contains instructions that when executed cause the at least one processor, using an interaction model that incorporates the obtained at least one item data, to generate a user response prediction for a user and another interaction event.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as Samsung HomeSync™ Apple TV™, or Google TV™), a gaming console (Xbox™, PlayStation™), such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 3A and 3B illustrate an example of displaying RTB ads in accordance with this disclosure;

DETAILED DESCRIPTION

Figure 1:
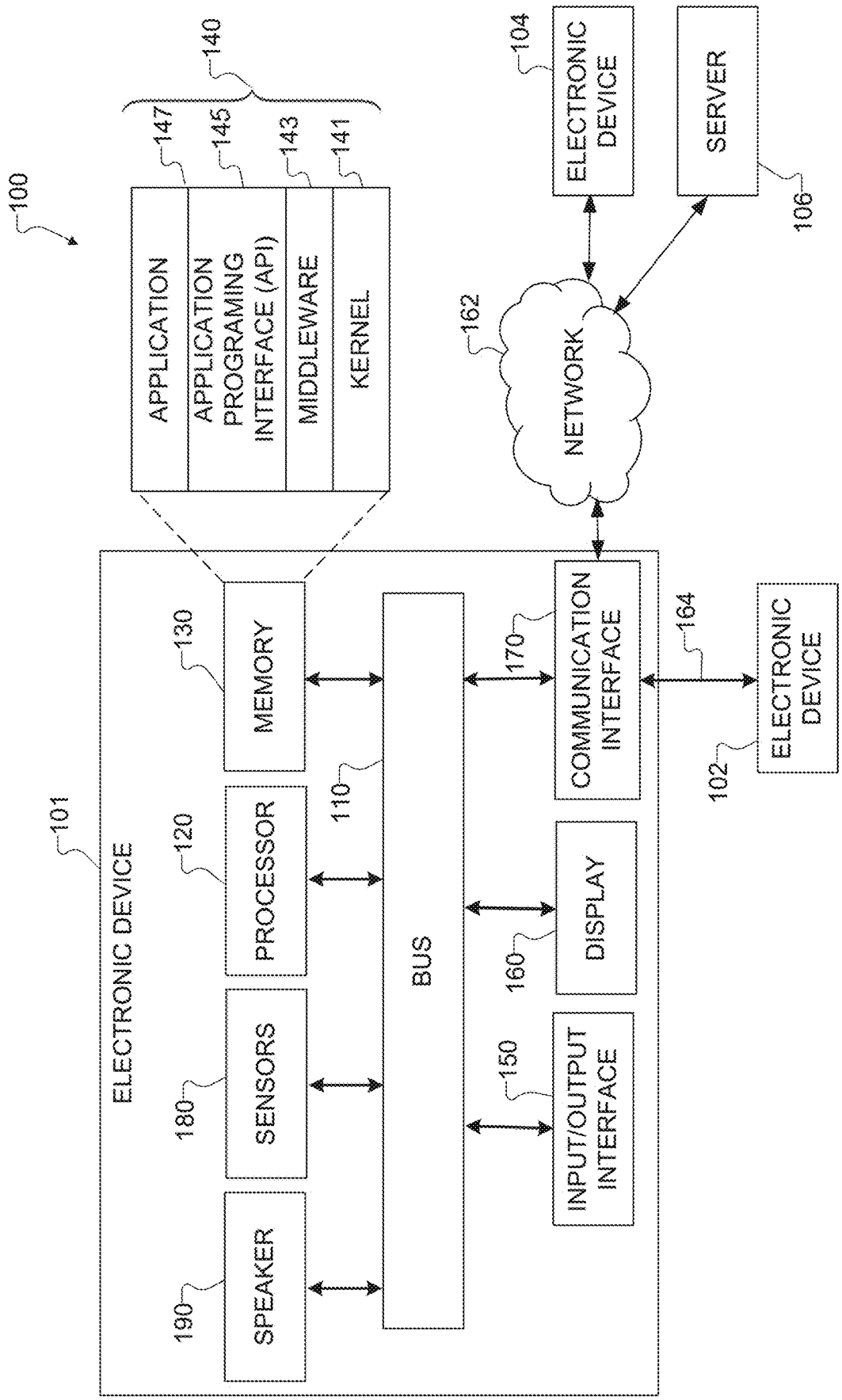
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, real-time bidding (RTB) is an increasingly popular paradigm of digital advertising. RTB that features per-impression-level real-time ad auctions has become a popular practice in today's digital advertising industry. In RTB, click-through rate (CTR) prediction is a fundamental problem to ensure the success of an ad campaign and boost revenue. An exemplary embodiment of this disclosure discloses a dynamic CTR prediction model designed for a demand-side platform (DSP). From example production data, two key technical challenges were identified that have not been fully addressed by the existing solutions: the dynamic nature of RTB and user information scarcity.

In performance-based advertising, an advertiser makes a payment only when a measurable "action" (for example, click, install, first open) happens due to an advertisement (also referred to herein as "ad"). To make such advertising effective, a critical task is to precisely predict users' responses to each ad impression because accurate predictions could significantly improve the subsequent decision-making process such as bidding optimization and eventually benefit different stakeholders in the RTB ecosystem, including advertisers, DSPs, ad networks, and supply-side platforms (SSPs). The most fundamental prediction task is, given a potential ad impression, to predict the probability of a specific user clicking a specific ad in a specific context. This task is referred to as click-through rate (CTR) prediction.

In digital advertising, CTR prediction systems are essential and widely adopted for different advertising paradigms (e.g., search ads, sponsored ads and RTB). CTR prediction refers to the problem of predicting the probability of a specific user clicking a specific ad in a specific context (e.g., inventory apps, the timestamp and the day of a week).

As stated above, the underlying data in RTB is highly dynamic. Due to the nature of the RTB ecosystem, the set of users, the ad campaigns, and even the set of inventories of users and inventories may change quickly on a daily basis. Even worse, the set of users and the set of inventories a DSP may encounter in a day is unknown in advance. In addition, the ad campaigns run by a DSP may vary day by day. It follows that the data distribution during online serving may be different from that of the training data. This is called the covariate shift problem, which may lead to decreased prediction performance.

Further, most of the existing studies only utilize users' direct and explicit responses to impressions (e.g., the historical click actions) to model users' preferences. As mentioned earlier, such data is inherently scarce in RTB. To this end, besides explicit responses to ad impressions, certain embodiments of the present disclosure provide methods and systems to enrich users' preferences by leveraging their implicit behavior related to CTR as an auxiliary model. First, an auxiliary model to learn users' preferences for ads from a correlated data source, and further put forward a novel interaction layer to fuse users' preferences revealed from different types of behavior, in accordance with this disclosure. For example, a DSP may consider a users' app install/uninstall information as the auxiliary data source because it may reveal a users' recent preferences for apps.

Certain embodiments of the present disclosure also fully capture the dynamic nature of both users and ads. Embodiments of the present disclosure also provide techniques to model the dynamic evolutions of both users and ads, which not only addresses the dynamic nature of RTB, but also effectively learns beneficial long-term patterns to improve the performance of CTR prediction. Although certain systems ignore the dynamics of ads, embodiments of the present disclosure provide systems and methods to fully capture the dynamics of both users and ads by representing their temporal status based on their previous evolution processes. Through the disclosed method, some useful long-term patterns can also be captured from users' and ads' evolution processes.

Certain embodiments of the present disclosure provide a Dynamic Neural Network model tailored to address these two challenges. The Dynamic Neural Network effectively models the dynamic evolutions of both users and ads and integrates auxiliary implicit data sources (e.g., installed apps) to better model users' preferences. Certain embodiments provide an interaction layer that fuses both explicit user responses (e.g., clicks on ads) and implicit data sources to generate consolidated user preference representations. The model was evaluated using a large amount of data collected from an advertising platform and compared against several state-of-the-art methods suitable for real-world deployment. The evaluation results demonstrate the effectiveness of an embodiment of the proposed method and the suitability for production. In addition, embodiments address a few practical engineering challenges due to big data to make the exemplary model in readiness for deployment.

In certain embodiments, a novel neural network model for CTR prediction, which effectively leverages implicit auxiliary data to overcome the data scarcity problem in RTB. A unique implicit data source (i.e., users' app install/uninstall information) is considered and may be integrated as an LSTM model into a Dynamic Neural Network. This may help model users' preferences. An interaction layer may fuse two sequence models, which further boosts model performance. Although certain embodiments are disclosed as using app install/uninstall information, embodiments utilizing other types of data sources can be used without departing from the scope of the present disclosure.

Additionally, offline evaluation of certain embodiments disclosed herein using hundreds of millions of records have been conducted. The experimental results show that the models disclosed herein outperform recent CTR prediction techniques.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

In order to increase understanding of the methods and systems herein, three common paradigms of digital advertising are discussed below: search advertising, sponsored advertisements, and RTB. The techniques used in different advertising paradigms differ substantially. For example, search ads mainly focus on contextual information of a query, rather than user modeling, which is a key factor for RTB. As another example, the techniques for search advertising normally rely on text mining and/or natural language processing (NLP), which are rarely used for RTB. In addition, RTB has very limited information to model users. The rich user information used in sponsored ads is not available in RTB.

Search advertising is a method for placing online advertisements on a web page along with query results (not shown), which are returned by a search engine. For example, a user may enter a textual query and the search engine matches the query with the bidwords of different advertisers and returns the best advertisements along with the query results to the user. For example, bidwords may include, for example, "wireless," "phone," "Smartphone," or other words shown.

Sponsored advertisements are commonly seen on e-commerce platforms (for example, on AMAZON) or in app stores (for example, on GOOGLE PLAY). Sponsored ads may appear on the first page of search results or on product pages. In some cases, the sponsored ads may be unrelated to the result of a search.

In RTB advertising, advertising inventory may be bought and sold on a per-impression basis via programmatic instantaneous auction. The ad exchange may broadcast the bid request to all connected DSPs.

RTB is an increasingly popular paradigm of digital advertising. RTB features per-impression-level real-time ad auctions. A majority of ads displayed in mobile apps are from the RTB ecosystem. CTR prediction (i.e., predicting the probability of a user clicking a served ad) is the most fundamental machine learning problem in RTB because the predicted CTR reflects the value of an ad impression and is used to determine the bid price and in turn the revenue. Therefore, developing highly accurate CTR prediction models is of utmost importance for an advertising service.

Figure 2:
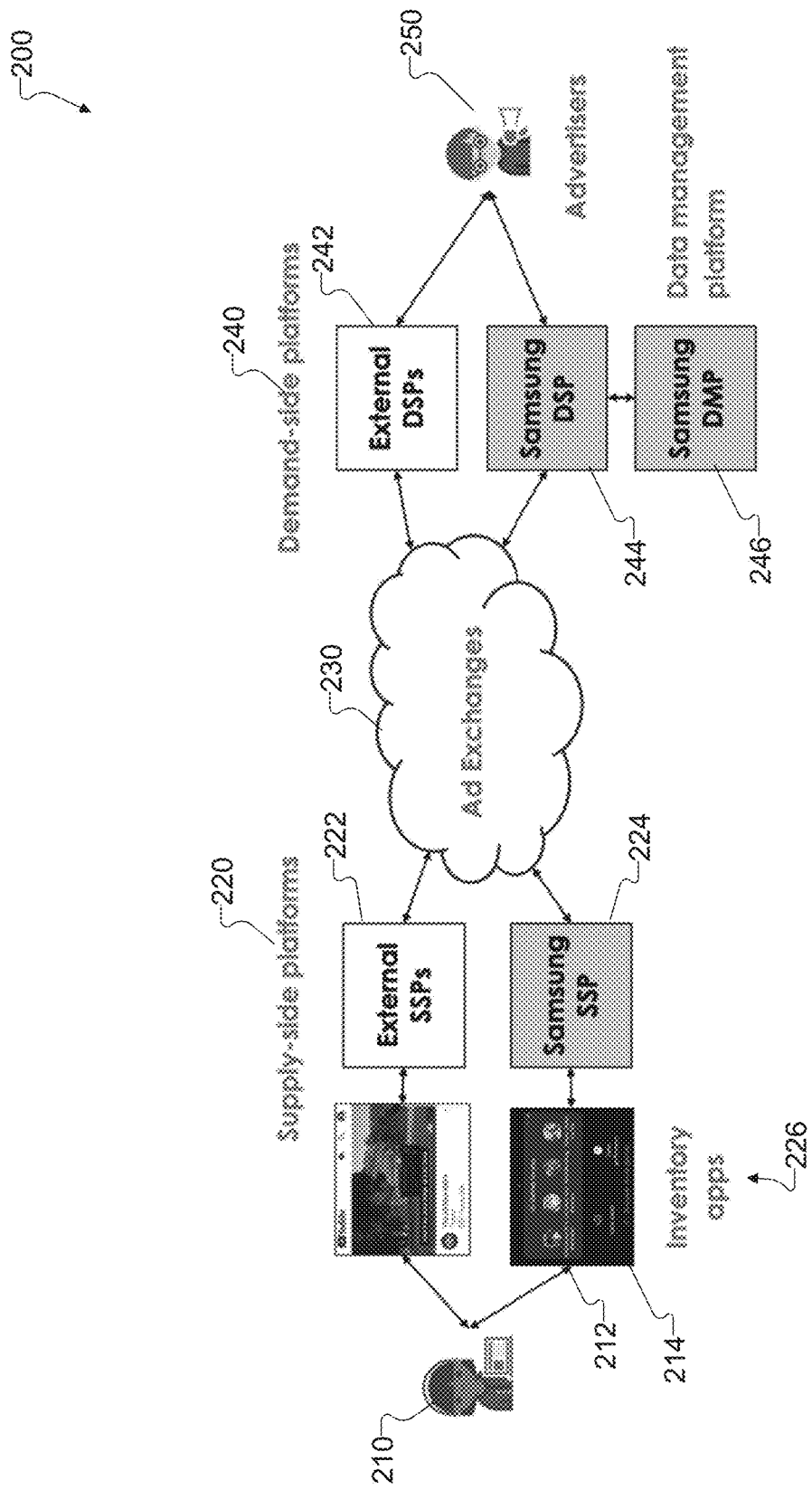
FIG. 2 illustrates an example of a simplified RTB ecosystem in accordance with this disclosure.

FIG. 2 illustrates an example of a simplified RTB ecosystem 200 according to embodiments of the present disclosure. The simplified RTB ecosystem 200 shown in FIG. 2 is for illustration only and other embodiments could be used without departing from the scope of the present disclosure.

An RTB ecosystem 200 can include one or more users 210, SSP 220, ad exchanges 230, DSPs 240, or advertisers 250. SSP 220 can include at least one of external SSPs 222 or internal SSPs 224. Each inventory app is connected to one SSP 220. There are many SSPs in the market. For example, internal SSP 224 and external SSP 224 can reference different owning or operating entities. An ad slot 212 may reside in one or more inventory apps 226. Inventory apps 226 may also include specifications of the ad slot 212, or other data or other information. The DSP 240 can include at least one or more external DSPs 242, internal DSPs 244, or Data Management Platforms (DMP) 246. External DSP 242 and internal DSP 244 can refer to DSPs owned or operated by different entities where the external DSP 242 corresponds to a first entity and the internal DSP 244 corresponds to a second entity. The DMP 346 is an independent part that collects data to support machine learning tasks in a DSP.

FIGS. 3A and 3B illustrates an example of displaying RTB ads according to this disclosure. The example of the RTB ads shown in FIGS. 3A and 3B are for illustration only and other examples could be used without departing from the scope of the present disclosure.

Since RTB is an open system, any inventory (or publisher app) and DSP 240 can participate in real-time auctions as long as they follow the OpenRTB protocol. In the example shown in FIGS. 3A and 3B, two RTB ads displayed on a DSP 240's inventory 226. For example, a game launcher 360 for a DSP game is shown in FIG. 3A while a game platform 365 (e.g., HAPPY COLOR, com.pixel.art.coloring.color-.number) for an external inventory is shown in FIG. 3B. For example, the game launcher 360 can include a region 370 in which RTB ads 372 are displayed. The game platform 365 can be generated by a third-party vendor, i.e., an external inventory application. For example, in the example shown in FIG. 3B, HAPPY COLOR, which is developed by an external (i.e., third party) vendor is depicted. RTB ads 372 are included in an advertising region 375 in the game platform 365.

Figure 4:
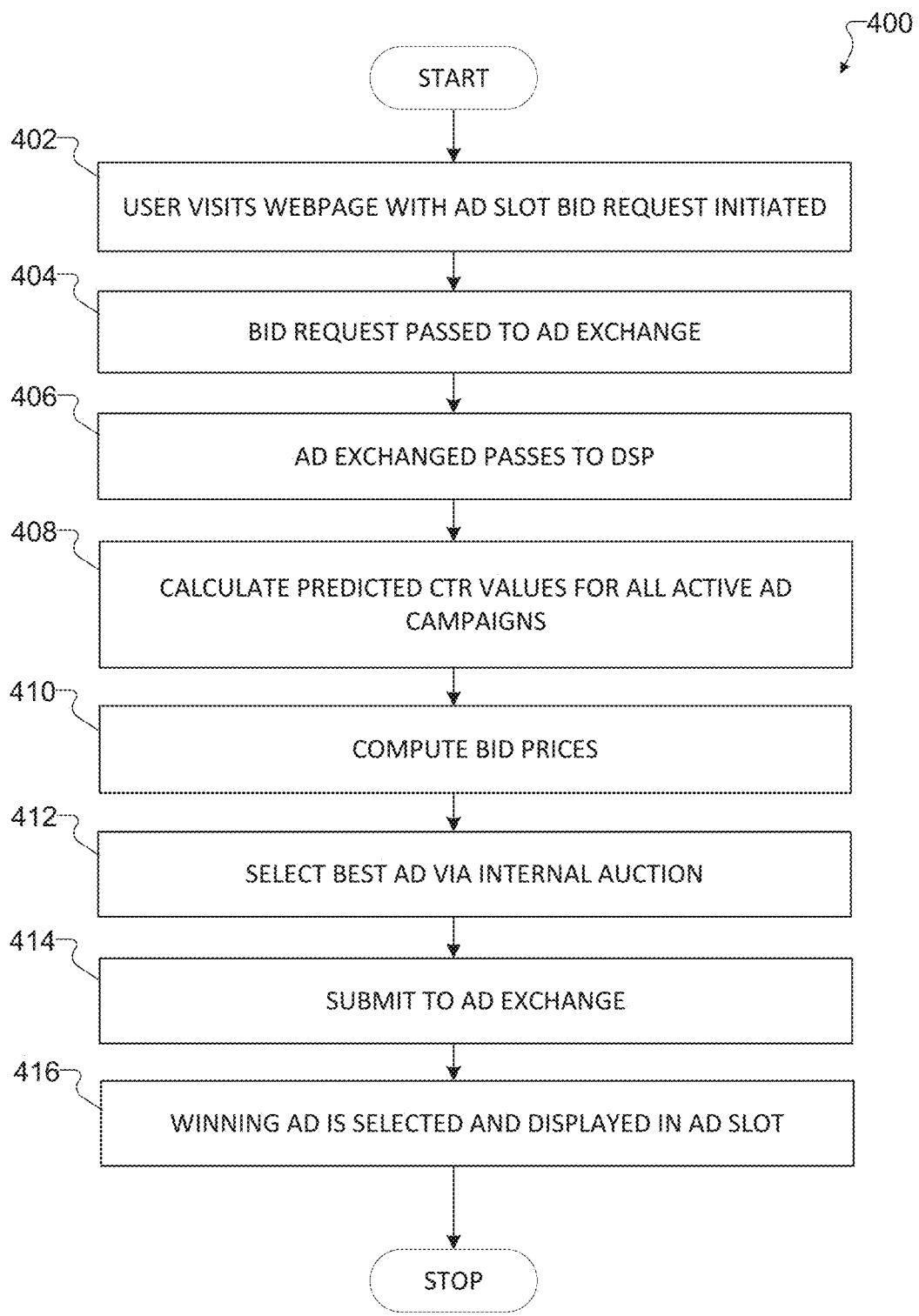
FIG. 4 illustrates a process for an RTB ecosystem in accordance with this disclosure.

FIG. 4 illustrates a process 400 for an RTB ecosystem 300 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in an electronic device.

In operation 402, a bid request 360 is initiated. For example, a user 210 may open a webpage 214 in which the webpage 214 includes an ad slot 212. When the user 210 visits the webpage 214 with an ad slot 212, the bid request 360 is initiated.

In operation 404, the bid request 360 is passed to an ad exchange. While the page loads, the bid request 360 can be passed to an ad exchange 230 via an SSP 220 or an ad network.

In operation 406, the bid request 360 is passed to an ad exchange 230. For example, the SSP 220 can forward the bid request 360 to the ad exchange 230 in response to receiving the bid request 360 from the inventory app 360. In certain embodiments, the inventory app is an internal inventor app, such as developed by the manufacturer of the mobile device or the controller of the platform or eco system. In certain embodiments, the inventory app 360 is an external inventor app, such as developed by a third-party vendor.

After receiving a bid request 360 from an ad exchange 230, in operation 408, the DSP 240 calculates the predicted CTR values for all active ad campaigns. That is, a DSP 240 receives the bid request 360 via the ad exchange 230. Thereafter, the DSP 240 calculates the predicted CTR values. The DSP can be an internal DSP or an external DSP.

In operation 410, the DSP 240 computes bid prices. For example, a processor in the DSP 240, or corresponding device or server, can use a bidding strategy to compute the bid prices. One strategy may take the predicted CTR values as input.

Thereafter, the DSP 240 selects the best ad in operation 412. For example, the DSP 240 can select the best ad via an internal auction.

In operation 414, the DSP 240 submits the selected best ad to the ad exchange 230. A winning bid is selected from multiple DSPs' bid responses at the ad exchange 230.

Finally, in step 416, the winning bidder's ad may be displayed in the ad slot 212. For example, the selected ad can be incorporated into a specified region on the game launcher or on the application.

The entire a process 400 for an RTB ecosystem 300 can be accomplished less than 100 ms. It is worth noting that, unlike some scenarios in the sponsored advertising setting where having a relative ranking of ads is sufficient, accurately predicted CTR values are indispensable in RTB because they can directly affect the resultant bid prices and, in turn, a campaign's performance. For this reason, in certain embodiments, an extra calibration process may be utilized to adjust the predicted CTR values in order to prevent over-prediction and bid price inflation.

DSPs are an important component of the RTB ecosystem. A DSP serves as a surrogate of advertisers to manage their ad campaigns and respond to real-time bid requests in a programmatic manner. A DSP is normally equipped with multiple machine learning models to help advertisers spend their advertising budgets more effectively. A DSP is supported by a Data Management Platform (DMP) from which the DSP obtains historical data for better modeling. In the case of some DSPs, a proprietary DMP may be in place to meet the data needs. The DMP can include some unique data sources, including app install information collected with users' consent. The CTR prediction model may be a machine learning model in the DSP.

DSPs may be concerned with performance-based advertising to promote apps for app developers, where CTR prediction is of utmost importance. A CTR prediction problem noted is: given a real-time bid request, predict the probability of a specific user clicking a specific app ad displayed in a specific ad slot in a specific context. In particular, the data used to model a user includes bid requests of winning impressions, feedback on impressions (e.g., click or no-click), and lists of installed apps on a daily basis.

Certain embodiments of the present disclosure herein provide techniques for more accurate CTR prediction in RTB. In certain embodiments, additional related implicit data (e.g., unique device-related data collected on smartphones) are used to make more accurate predictions. Additionally, other techniques to improve the accuracy of CTR prediction in RTB are also disclosed herein. While embodiments of the present disclosure are described in the context of CTR prediction, various embodiments are equally applicable to other important user response prediction tasks, such as, conversion prediction, prediction on the return on advertising spend (ROAS) and prediction on user life-time value.

In the certain embodiments of the present disclosure, the CTR prediction problem used can be: given a real-time bid request, predict the probability of a specific user clicking a specific app ad displayed in a specific ad slot in a specific context. In particular, the data used to model a user includes bid requests of winning impressions, feedback on impressions (e.g., click or no-click), and lists of installed apps on a daily basis.

CTR prediction is a fundamental machine learning problem in any DSP. DSPs are a key component of the RTB ecosystem. A DSP serves as a surrogate of advertisers to manage their ad campaigns and responds to real-time bid requests in a programmatic manner. The performance of CTR prediction directly relates to the revenue of a DSP. Embodiments of the present disclosure provide a framework for more accurate CTR prediction by effectively addressing two main challenges in the RTB system: inherent dynamic nature and user information scarcity. First, the framework features an approach to model the dynamic evolutions of both users and ads, which not only addresses the dynamic nature of RTB, but also effectively learns long-term patterns to improve the performance of CTR prediction. Second, embodiments of the present disclosure leverage other relevant implicit data source to augment users' explicit feedback to ad impressions. For example, device-related data (e.g., users' app usage or install/uninstall information), may be considered, as an implicit data source to improve the performance of CTR prediction. Such implicit data may be modeled by for example, a sequence model. The device related data or other data may be aligned with advertising data. An interaction layer may be integrated to fuse the explicit feedback to ads and the implicit data for an improved representation of a user's preference. It is noted that embodiments of the present disclosure are also applicable to other business applications, such as, recommender systems, where accurate user response prediction is needed.

Embodiments of the present disclosure provide a neural network model to capture the dynamic evolutions of both users and ads. Certain embodiments of the present disclosure leverage related implicit data source (e.g., device-related data) to enhance user behavior modeling and model such a data evolution process with a sequence model. Certain embodiments of the present disclosure align a users' implicit data (e.g., app usage/install information) with users' explicit feedback (i.e., ad impression/click events) and design an interaction layer to fuse these two types of information along the timeline. It is noted that smartphone manufacturers may possess unique device-related data (e.g., app usage or install/uninstall information). Certain embodiments in this disclosure utilize an implicit data source (e.g., device-related data) to substantially improve the accuracy of CTR prediction. Device-related data is one possible data source that can be used with the exemplary embodiments herein. However, this disclosure is not limited to device-related data sources. Other data sources may also be used, depending on different applications.

Figure 5:
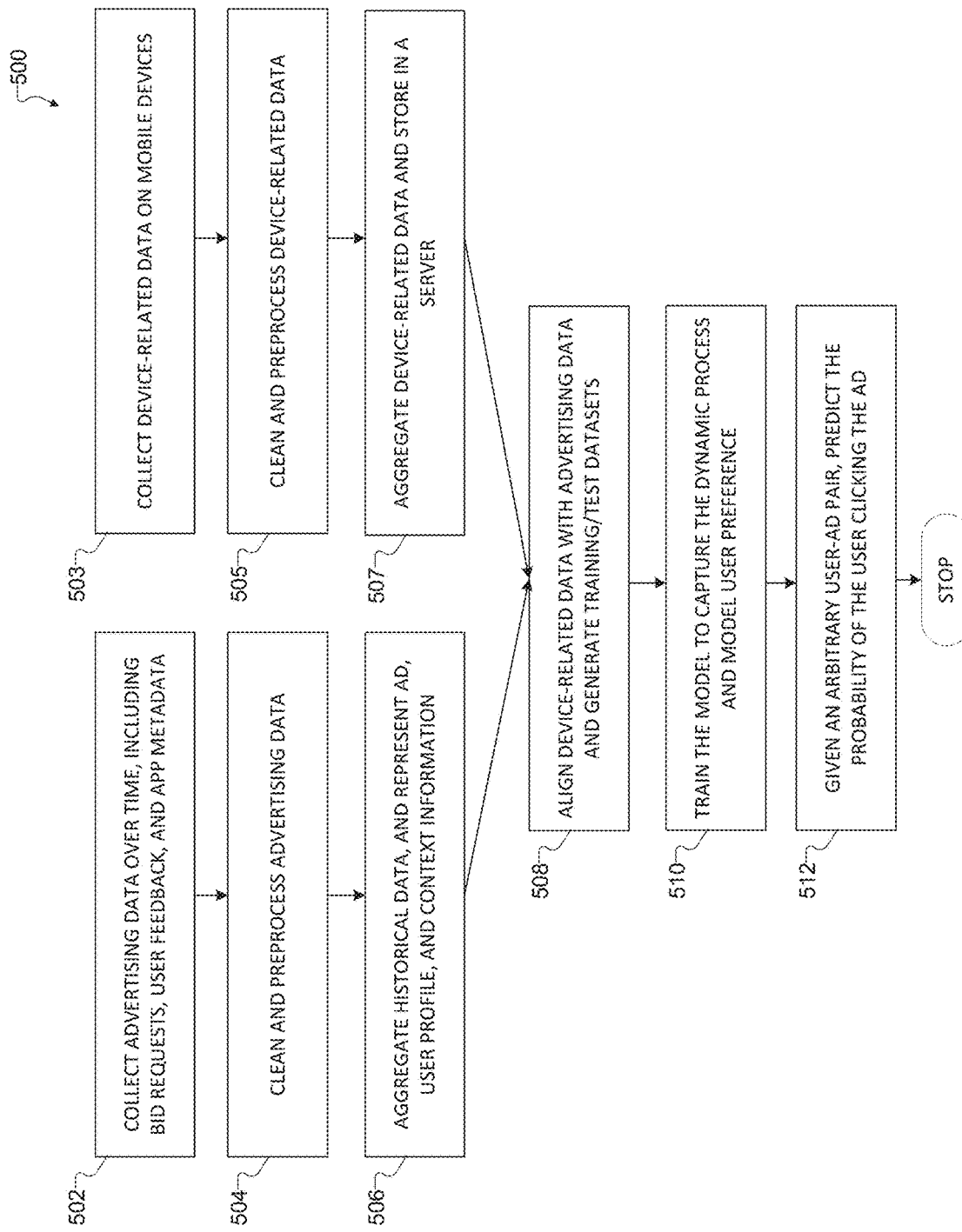
FIG. 5 illustrates a process for preparing and performing CTR prediction in accordance with this disclosure.

FIG. 5 illustrates a process for preparing and performing CTR prediction according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example is implemented by a processor in an electronic device.

In operation 502, advertising data is collected over time. The advertising data includes bid request, user feedback, and application metadata. The advertising data may be directly collected from an RTB ecosystem or by other available means. In operation 503, relevant device-related data for CTR prediction is collected over time. The device-related data on a mobile device can correspond or be interpreted as user related data. The device-related data includes bid requests, user feedback, device-related data (e.g., users' installed apps or app usage), or app metadata (e.g., title, category, developer and rating). Other data, such as device-related data or external data, could be independently collected from mobile devices or other devices or sources. Some concrete device-related data programs may provide a log of data with fixed time intervals on a device. For example, one or more of the following may be logged: user id, start timestamp, end timestamp, app package name, cached in the device, and transmitted to a server on a daily basis or whenever a WiFi connection becomes available.

In operation 506, historical data, such as historical requests and feedback data on the user and ad over a certain period of time may be collected and aggregated. Additionally, in operation 507, device-related data is aggregated and stored on a server, such as a database in the server. With the request features and aggregated user/ad features, ads, user profile and context information may be represented in a more meaningful way. The aggregated advertising data and device-related data could be stored in a database or files on the server.

In operation 504, the advertising data and other data is cleaned, preprocessed, and aggregated in a server (e.g., DMP 246 in FIG. 3A). For example, the advertising data can be independently cleaned, preprocessed, and aggregated in the server. Additionally, in operation 507, device-related data is cleaned, preprocessed, and aggregated in the server. Similarly, the advertising data can be independently cleaned, preprocessed, and aggregated in the server.

In step 508, the device-related data, or other collected and aggregated data, may be aligned with the advertising data based on ad impression events along a timeline. For example, for each ad impression event, identify the app usage information or app install/uninstall information right before the event. Then features are generated from aligned data. Additionally, training and test datasets are generated.

In operation 510, the model is trained to capture the dynamic processes and model user preferences. For example, three components in the neural network shown in FIG. 6A below, train the dynamic neural network to capture the dynamic process and model user preference.

In step 512, given a pair of an arbitrary user and a particular ad, the trained model predicts the probability of the user clicking the particular ad.

Figure 6A:
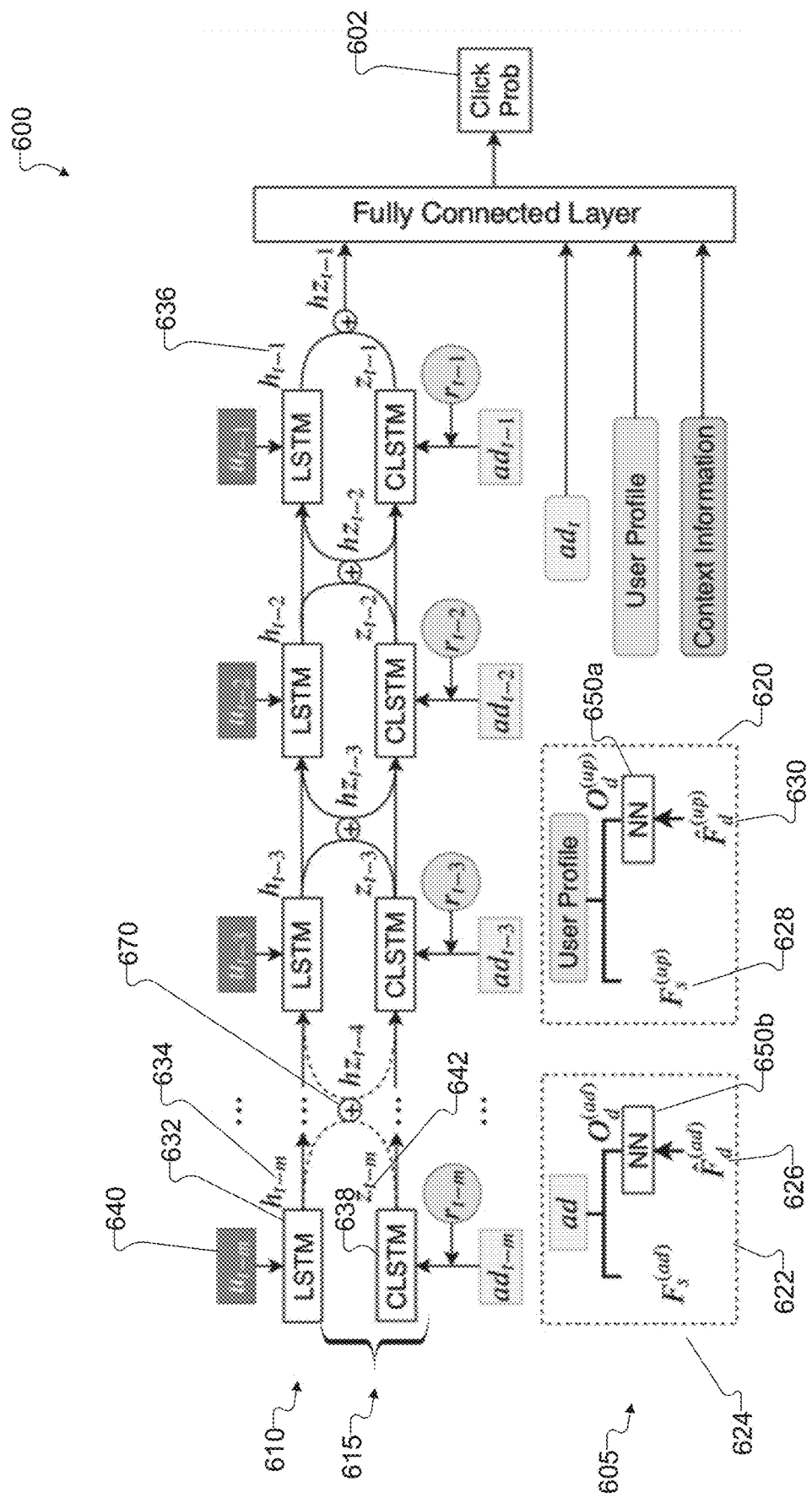
FIG. 6A illustrates an exemplary architecture of dynamic neural network in accordance with this disclosure.

FIG. 6A illustrates an exemplary architecture of dynamic neural network 600 in accordance with this disclosure. The dynamic neural network 600 includes a first component 605; a second component 610; and a third component 615. The embodiment of the dynamic neural network 600 shown in FIG. 6A is for illustration only and other embodiments could be used without departing from the scope of the present disclosure.

According to certain embodiments of the present disclosure, the Dynamic Neural Network 600 is configured to effectively addresses the aforementioned challenges in RTB. The Dynamic Neural Network 600 models the dynamic evolutions of both users and ads, which not only addresses the dynamic nature of RTB, but also effectively learns beneficial long-term patterns to improve the performance of CTR prediction. The Dynamic Neural Network 600 also models a CTR prediction 602, which effectively leverages implicit auxiliary data to overcome the data scarcity problem in RTB. In certain embodiments, a unique implicit data source, such as a users' app install/uninstall information, is integrated into Dynamic Neural Network 600 as an LSTM model, which helps better model users' preferences. In certain embodiments, an interaction layer fuses two sequence models, which further boosts model performance. Although app install/uninstall information is described herein, other types of data sources may be utilized without departing from the scope of the present disclosure.

Representation of users' historical behavior utilizes two pieces of information to represent a user's historical behavior: the information of displayed ads and the user's responses to them. Generally, a user's action on an ad reflects his/her preference for the ad. At time t, the historical behavior can be represented as a sequence of at most m ad-action pairs ordered by time, where m is a tunable parameter:

$$\{(ad_{t-m}, r_{t-m}), \ldots, (ad_{t-2}, r_{t-2}), (ad_{t-1}, r_{t-1})\} \quad (1)$$

The above representation represents the user's last m interactions with ads. Each element $(ad_k; r_k)$ of the sequence is an ad-response pair, where $ad_k$ represents the features of the kth ad, and $r_k$ represents the user's corresponding response on the kth ad. An ad is represented as a one-dimensional vector which includes its temporal and historical aggregated information. Discuss of how to represent an ad will be shown in subsequent sections. Here two types of user actions are considered: no-click and click. $r_k=0$ represents no-click, i.e., the user did not click an ad impression; $r_k=1$ represents a click on an ad impression, showing a user's interest on the ad.

The user's historical behavior includes a series of user activities with a temporal dependency, and the user's behavior at each timestamp comprises two components: the ad's information and the user's corresponding action. A contextual long-short term memory (CLSTM) may be adopted to learn a user's preference through historical behavior. CLSTM is a variant of the classical long-short term memory (LSTM) model, which combines the power of contextual information. Each cell of CLSTM may have three input components: ad features $ad_k$, the user's response $r_k$ and the hidden state of the previous cell $z_{k-1}$.

After the initialization, at k-th step, the hidden state $z_k$ is updated by the previous hidden state $z_{k-1}$, the current ad features $ad_k$ and the user's current action $r_k$ as follows:

$$\begin{cases} i_k = \sigma(W_{xi}ad_k + W_{ri}r_k + U_i z_{k-1} + W_{ci}c_{k-1} + b_i) \\ f_k = \sigma(W_{xf}ad_k + W_{rf}r_k + U_f z_{k-1} + W_{cf}c_{k-1} + b_f) \\ c_k = i_k \odot \tanh(W_{xc}ad_k + W_{rc}r_k + U_c z_{k-1} + c) + f_k \odot c_{k-1} \\ o_k = \sigma(W_{xo}ad_k + W_{ro}r_k + U_o z_{k-1} + W_{co}c_{k-1} + b_o) \\ z_k = o_k \odot \tanh(c_k) \end{cases} \quad (2)$$

where $i_k$, $f_k$ and $o_k$ are the input gate, the forget gate and the output gate, respectively. They share the same equation, but have different weight matrices. $c_k$ is the internal memory of each cell. The $\odot$ denotes the Hadamard product $\sigma$ is the sigmoid function. $W_{xi}$, $W_{ri}$, $W_{ci}$, $W_{xf}$, $W_{rf}$, $W_{cf}$, $W_{xc}$, $W_{rc}$, $W_{xo}$, $W_{ro}$, $W_{co}$, $U_i$, $U_f$, $U_c$, $U_o$ are weight matrices, and $b_i$, $b_f$, $b_c$, $b_o$ are bias vectors.

The final output of this component may be the hidden state of the last CLSTM cell, which can be represented as $O=z_{t-1}$. This output can be considered as an aggregation of all historical information.

Representation of Ad.

In an embodiment, the representation of ad may be performed as described herein. The value $ad_k$ represents the kth ad displayed to a user. The ad features can be categorized into two groups: static feature set $F_S^{(ad)}$ and dynamic feature set $F_d^{(ad)}$. $F_S^{(ad)}$ generally remains stable and would not change frequently over time. It represents an ad's basic information, such as ad title, category, rating, and developer. In contrast, $F_d^{(ad)}$ changes frequently over time and represents the popularity of an ad. The dynamic feature set can be represented as $$F_d^{(ad)} = [d_1, d_2, \ldots, d_n] \quad (3)$$

where $d_i$ denotes the i th dynamic feature. Most dynamic features are calculated based on the historical click information of ads within a fixed time period. A concrete example of dynamic features is the average click-through rate of an ad in the last two weeks. Its value varies every day because of the change of the underlying user groups and/or users' interests.

According to certain embodiments, a representation of user profile may be as described herein. Similar to an ad, the feature representation of a user can also be categorized into two types: static feature set $F_S^{(up)}$ and dynamic feature set $F_d^{(up)}$. $F_S^{(up)}$ ($^{(up)}$) contains a user's basic profile information, such as cellphone model, carrier, language, region, and the like. Additionally, $F_d^{(up)}$ represents a user's recent activeness, such as the timestamp of the last click time and the average click-through rate in the past two weeks.

Considering the complexity of real-world deployment, the evolution of dynamic features may not be monitored in real time. Instead, they may be processed on a daily basis, which means the dynamic features change on a daily basis.

Certain embodiments provide a representation of context information. Besides the information from the perspectives of users and ads, it is also important to consider the context of a bid request. Such context information reveals when and how an event happens. The context information normally includes event time, ad slot position, and the information of the inventory. Most of the features are encoded as one-hot vectors. An embodiment may encode cyclic continuous features (e.g., hour of a day and day of a week) into two new features via sine and cosine transformations.

After obtaining the four types of representations, the four types of representations may be combined into a dense vector representation and fed into fully connected layers to predict the final probability of a click. The binary cross entropy loss may be employed as the loss function for the CTR prediction which is a binary classification problem. Specifically, the cost function is defined as follows:

$$c = -\frac{1}{n}\sum_{i=1}^{N}(y_i \log p(y_i) + (1-y_i)\log(1-p(y_i))) \quad (4)$$

where $y_i$ is the label, $p(y_i)$ is the predicted probability for $y_i$, and N represents the number of training samples.

Referring back to FIG. 6A, the first component 605 is configured to capture the dynamics. Two feedforward neural networks 650a and 650b are applied to the dynamic features of users 630 and ads 626 to model their long-term evolving patterns. In the ads 622, ad features are divided into two groups: static features 624 ($F_S^{(ad)}$, including ad title, category, rating, developer, etc.) and dynamic features 626 ($\hat{F}_d^{(ad)}$, a sequence of each ad's historical click information, for example, the average CTRs of an ad in different time intervals). Similarly, the user features 620 can be categorized into two types: static features 628 ($F_S^{(up)}$, user's basic profile, like cellphone model, carrier, language and region) and dynamic features 630 ($\hat{F}_d^{(up)}$, a sequence of each user's recent activeness, like the average number of clicks in different weeks).

Input: Static and Dynamic Features of Ads and Users.

Block: the two feedforward neural networks 650a and 650b are applied to the dynamic features of users and ads to model their evolution processes. In certain embodiments, the weight for the first feed forward neural network 650a for user devices is different than a weight for the second feed forward neural network 650b for ads. In certain embodiments, the same weights of the two feedforward neural networks 650a and 650b are shared among all ads and all users, respectively, in order to reduce the model's complexity.

Operation: Here the set of dynamic features can be represented as $$\hat{F}_d^{(\cdot)} = [\hat{d}_1, \hat{d}_2, \ldots, \hat{d}_n] \quad (5)$$

where $\hat{d}_i$ represents the i-th dynamic feature, and $\hat{d}_i$ includes a set of points, $$\hat{d}_i = [\hat{d}_{i-k}, \ldots, \hat{d}_{i-1}, \hat{d}_i] \quad (6)$$

where k denotes the number of total previous events. The output of a feedforward neural network is $O_{\hat{d}_i} = f(W_d \hat{d}_i + b_d)$ and where $W_d$ is a weight matrix to learn, $b_d$ is the bias, and $f(\cdot)$ is a non-linear activation function.

Output: Ad and User Profile Fed to Connected Layer

Dynamic features of users and ads: user profiles and ads' characteristics also evolve over time, and thus embodiments may be able to explicitly model such dynamic evolutions.

The second component 610 is configured to leverage users' device-related data (e.g., app install/usage information). A sequence of app install or usage information is fed into an long-short term memory (LSTM) model 632 to represent a user's implicit preference and interest with respect to ad impressions. The second component 610 aims to model dynamic evolution of user's ads to feed into the fully connected layer by dividing features of users and ads into static and dynamic, and use neural networks to model dynamic features.

The second component 610 illustrates modeling user's preferences. As previously illustrated, two types of actions are considered: click and no-click. A user's past clicks, in contrast to no-clicks, are more direct observations of his/her real interest and have a more direct impact on predicting his/her future click intention to an ad. In the context of RTB, click events are very sparse compared to impression events without a click. In the DSP, a unique data source is considered, app install/uninstall information, as the auxiliary data source.

The third component 615 is configured to integrate the information from both explicit feedback to ad impressions and device-related data for better user modeling.

The second component 610 and third component 615 aim to leverage a users' device-related data (e.g., app install/usage information) and integrate the information from both explicit feedback to ad impressions and device-related data for better user modeling. To leverage a users' device-related data the second component 610 receives as an input a sequence of app install or usage information 640, which is fed into the LSTM model 632 to represent a user's implicit preference and interest with respect to ad impressions. Inside each cell of the LSTM model 632, a hidden state 634 is extracted from the input, which represents the temporal interest of the user, and this hidden state 634 is passed into following cells, finally generating an aggregated result 636. To integrate the information from both explicit feedback to ad impressions and device-related data for better user modeling: First, the device-related data is aligned to users' explicit feedback to ad impressions (e.g., identify the app usage/installs right before each ad impression) along the timeline. This makes the cells of the LSTM model 632 and Contextual LSTM (CLSTM) model 638 aligned. The CLSTM model 638 is used to model users' explicit feedback to ad impressions while considering context information. For each pair of aligned LSTM and CLSTM cells, a weighted linear combination of the two hidden states ($z_k$ 642 and $h_k$ 634) is used as the input to the next cell of each model as the interaction strategy between the two interest evolution processes.

Input:

$u_k$—features to represent the apps aligned with the k-th ad impression, including the selected apps' distributions, the apps' category distributions, and some other aggregated information of the apps $ad_k$—the representation of the ad in the k-th ad impression; it is the output of the ad network given in the first component 605

$r_k$—the user's explicit feedback to the k-th ad impression. 0 means no click, and 1 means click Blocks:

CLSTM 638: Each ad impression is the basic information unit, and thus each ad impression event is modelled as a cell of the CLSTM 638. Context information (e.g., hour of day, day of week, connection type) is also included.

LSTM 632: For each CLSTM cell, construct the corresponding LSTM 632 cell containing the app usage/install information right before the ad impression Interaction unit: for each aligned pair of CLSTM 638 and LSTM 632 cells, compute a weighted linear combination of the two hidden states and pass them to the next cells. The CLSTM 638 and LSTM 632 are performed as illustrated with respect to Equation 2, reproduced here as follows:

$$\begin{cases} i_k = \sigma(W_{xi}ad_k + W_{ri}r_k + U_i z_{k-1} + W_{ci}c_{k-1} + b_i) \\ f_k = \sigma(W_{xf}ad_k + W_{rf}r_k + U_f z_{k-1} + W_{cf}c_{k-1} + b_f) \\ c_k = i_k \odot \tanh(W_{xc}ad_k + W_{rc}r_k + U_c z_{k-1} + c) + f_k \odot c_{k-1} \\ o_k = \sigma(W_{xo}ad_k + W_{ro}r_k + U_o z_{k-1} + W_{co}c_{k-1} + b_o) \\ z_k = o_k \odot \tanh(c_k) \end{cases}$$

The interaction between the k-th CLSTM cell and the k-th LSTM cell is done as follows:

$$hz_k = w_h h_k + w_z z_k \qquad (7)$$

$$hz'_k = w'_h h_k + w'_z z_k \qquad (8)$$

where $z_k$ and $h_k$ are the hidden states from the CLSTM cell and the LSTM cell, respectively, $w_h$ and $w_z$ are shared by all cells of the CLSTM model, $w'_h$ and $w'_z$ are shared by all cells of the LSTM model, $hz_k$ and $hz'_k$ are the new combined hidden states for the LSTM model and CLSTM model, respectively.

According to certain embodiments, the Dynamic Neural Network model may effectively address the two major challenges of: the inherent dynamic nature of RTB and user information scarcity.

Auxiliary Data Modeling.

For mobile users, it is natural to observe that the apps installed on their smartphones may reveal their interests in ads. For example, the categories of a user's installed apps can well represent his/her preference and interest; a recently installed app is likely to reflect the user's current interest. Similarly, it may be desired to model the evolution of apps installed by a user. Instead of simply modeling users' app install information as additional features, embodiments of the present disclosure provide an auxiliary model to make use of the evolution of a user's app install information that is aligned with his/her responses to ads, which achieves better performance. Therefore, learning the interactions between different data sources can improve the accuracy of CTR prediction.

Concretely, embodiments of the present disclosure make use of a time sequence to represent a user's installed apps at different timestamps, where the timestamps are aligned with the timestamps of his/her previous ad impressions. As shown in FIG. 6A, $u_k$ represents the user's app information at time k (e.g., t–m, t–3, t–2, etc.). It mainly includes three parts: the selected apps' distribution, the apps' category distribution, and some aggregated information of the apps. Multi-hot vectors are used to represent the apps' distribution and apps' category distribution. Some aggregated information is also used, like the total number of installed games and installed apps. To model a user's preference through the change of apps, the LSTM model is utilized, which is good at capturing the connection among events at different timestamps. The input to each cell of the LSTM model is a representation of the user's installed apps, which is an encoded vector. Inside each cell of the LSTM model, a hidden state is extracted from the input, which represents the temporal interest of the user, and this hidden state is passed into the following cells, finally generating an aggregated result.

Interaction Layer.

As described above, there are two models for modeling a user's two types of behavior: clicks of ads and installs/uninstalls of apps, both of which reflect the user's interest in displayed ads. These two models can be considered as two evolution processes. As a user's interest may be transferred through both evolution processes, there should be some interactions among them. Thus, an interaction layer is configured to learn the correlations between two sequence models. As the hidden state of each cell in a sequence model (LSTM and CLSTM) can be considered as a user's temporal aggregated preference, embodiments of the present disclosure propose to combine the hidden states of the two sequence models (LSTM and CLSTM) at each timestamp, and pass the combined result to the next cell of each model.

Figure 6B:
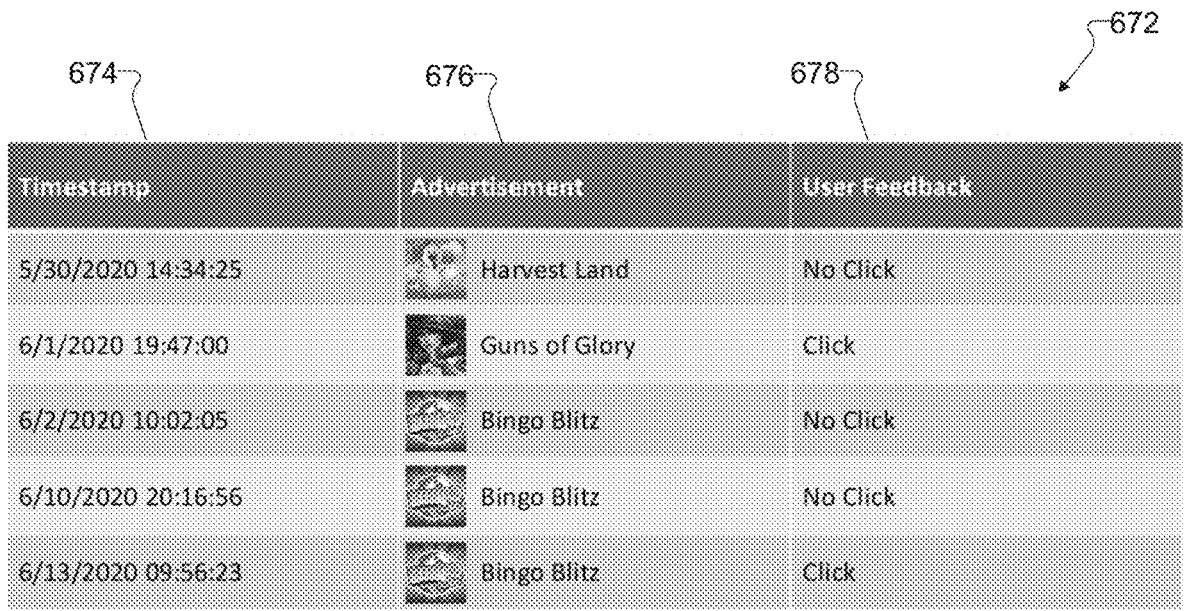
FIG. 6B illustrates example advertisement related data according to this disclosure.
Figure 6C:
FIG. 6C illustrates example device-related data according to this disclosure.
Figure 6D:
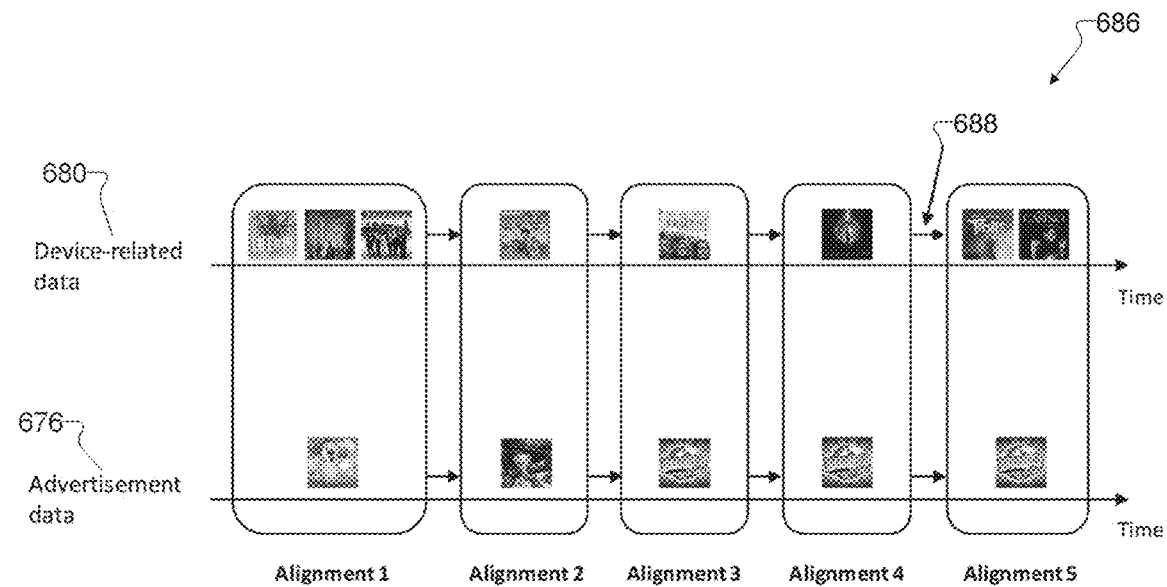
FIG. 6D illustrates an example alignment operation over time according to this disclosure.
Figure 6E:
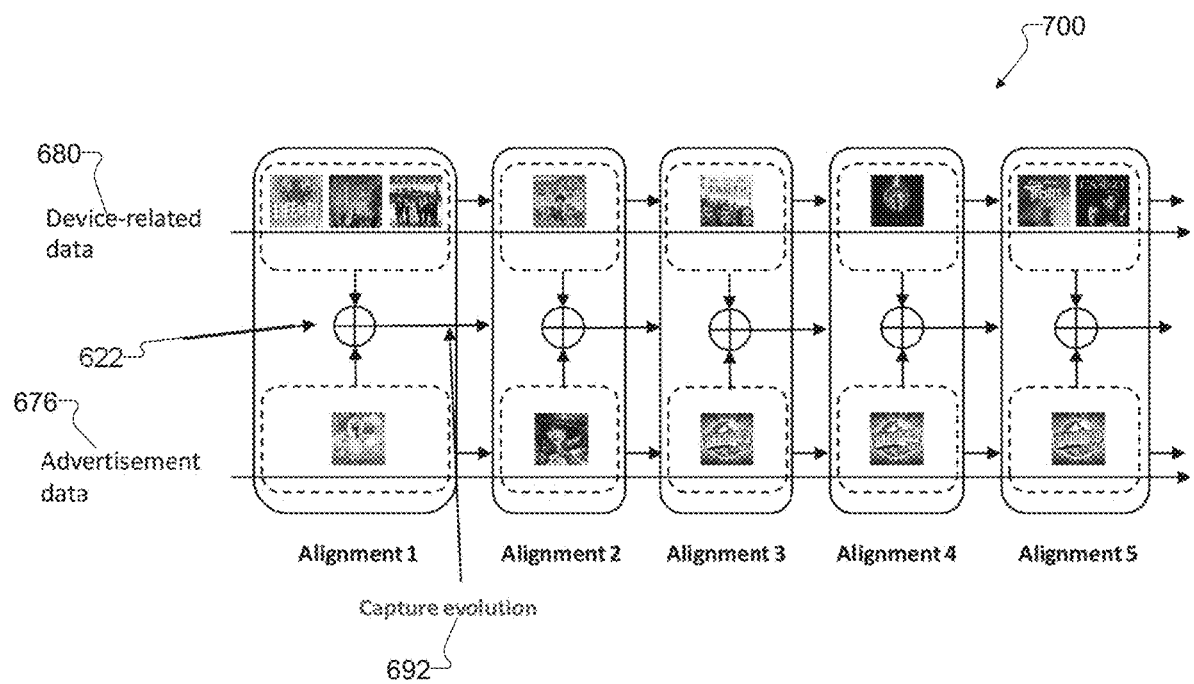
FIG. 6E illustrates an example event-level interaction and evolution according to this disclosure

FIG. 6B illustrates example advertisement related data according to this disclosure. FIG. 6C illustrates example device-related data according to this disclosure. FIG. 6D illustrates an alignment operation over time according to this disclosure. FIG. 6E illustrates event-level interaction and evolution according to this disclosure. The embodiments shown in FIGS. 6B-6E are for illustration only and other embodiments could be used without departing from the scope of the present disclosure.

In the example shown in FIG. 6B, advertisement related data 672 includes a timestamp 674, the advertisement 676, and a user response 678. In the example shown in FIG. 6C, device-related data 680 includes a timestamp 682 a program watched 684.

In certain embodiments, the dynamic neural network 600 performs alignment over time 686. That is, the dynamic neural network 600 performs multiple alignments on the advertisement related data 672 and the device-related data 680. Each data source is modeled as a sequence model 688. As illustrated herein with respect to FIG. 6A, the dynamic neural network 600 performs event-level interaction 690. That is, as described above, there are two models for modeling a user's two types of behavior: clicks of ads and installs/uninstalls of apps, both of which reflect the user's interest in displayed ads. These two models can be considered as two evolution processes including a capture evolution 692. As a user's interest may be transferred through both evolution processes, there should be some interactions among them. Thus, an interaction layer is configured to learn the correlations between two sequence models. As the hidden state of each cell in a sequence model (LSTM and CLSTM) can be considered as a user's temporal aggregated preference, embodiments of the present disclosure propose to combine the hidden states of the two sequence models (LSTM and CLSTM) at each timestamp, and pass the combined result to the next cell of each model.

Figure 7:
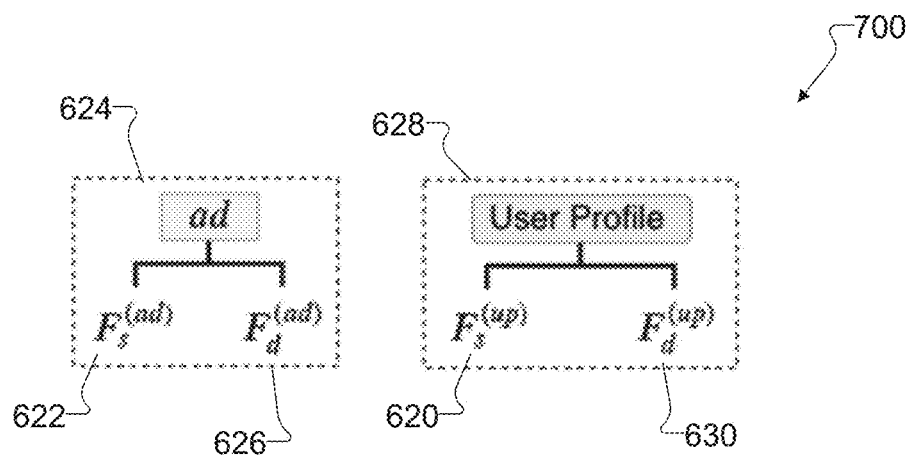
FIG. 7 illustrates an alternate first component of a dynamic neural network in accordance with this disclosure.

FIG. 7 illustrates an alternate first component 700 of a dynamic neural network 600 in accordance with this disclosure. The alternate first component 700 is included in the dynamic neural network 600 of FIG. 6A, which includes the second component 610 and the third component 615. The embodiment of the alternate first component 700 shown in FIG. 6A is for illustration only and other embodiments could be used without departing from the scope of the present disclosure.

In certain embodiments, the dynamic neural network 600 does not include the two feedforward neural networks 650a and 650b. That is, the first component 605 is replaced with alternate first component 700. In contrast to the first component 605 which includes two feedforward neural networks 650a and 650b that are applied to the dynamic features of users 630 and ads 626 to model their long-term evolving patterns, the alternate first component 700 directly uses $F_d^{(ad)}$ 626 (each ad's historical click information, like the average CTR on a particular day) and $F_d^{(up)}$ 620 (each user's recent activeness, like the average number of clicks in the past two weeks) as input features. The other components remain the same. The workflow may be the same as the process depicted in FIG. 5. This embodiment may be suitable for the scenario where one needs a lighter model and a faster training process.

Figure 8:
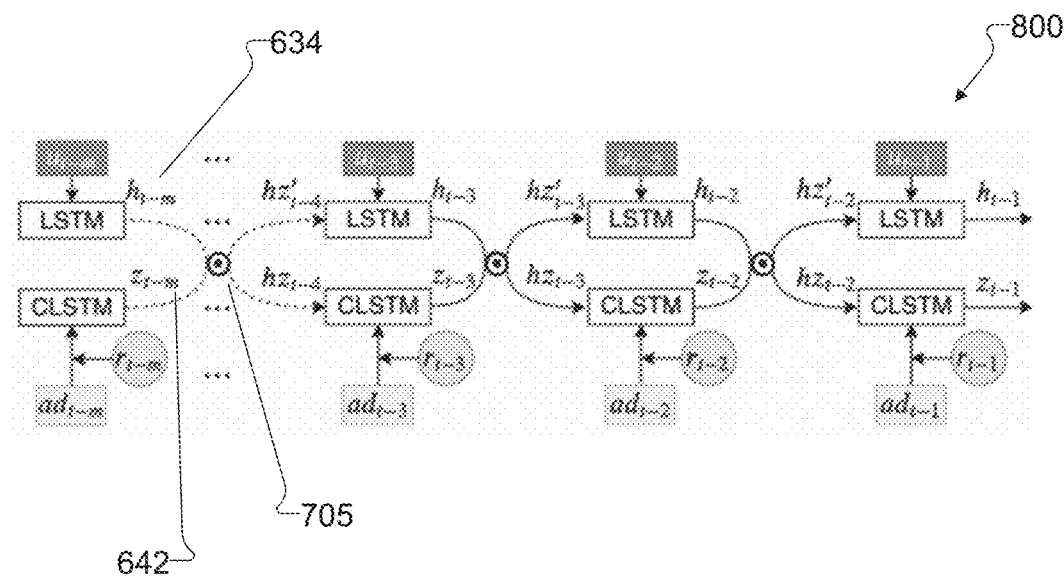
FIG. 8 illustrates an alternate third component 800 of a dynamic neural network 600 in accordance with this disclosure.

FIG. 8 illustrates an alternate third component 800 of a dynamic neural network 600 in accordance with this disclosure. The alternate third component 800 is included in the dynamic neural network 600 of FIG. 6A, which includes the second component 610 and either the first component 605 or the alternate first component 700. The embodiment of the alternate third component 800 shown in FIG. 6A is for illustration only and other embodiments could be used without departing from the scope of the present disclosure.

In certain embodiments, the dynamic neural network 600 is configured to use alternative interaction strategies as employed by alternate third component 800. That is, the dynamic neural network 600 can include a third component 800, which is the same as or similar to the third component 615; but the third component 800 is configured to use alternative interaction strategies. For example, instead of using a weighted linear combination 670, third component 800 can also adopt an element-wise product 705 or a concatenation of the two hidden layers 634, 642 as the input of the next cell of each model. The other components of the dynamic neural network 600 remain the same. The workflow is the same as the process depicted in FIG. 5.

While this disclosure focuses on the problem of CTR prediction, certain embodiments herein may also be used to predict conversions (e.g., app install, in-app purchase, sign-up for a mailing list, etc.). To support conversion predictions, labels of training examples are set according to a desired conversion event. For example, if the goal is to predict app installs, an ad impression that leads to an install will be labeled as positive. The workflow and neural network structure remain the same.

Although this disclosure has been described with reference to various example embodiments, various changes and modifications may be suggested to one skilled in the art. It is intended that this disclosure encompass such changes and modifications as fall within the scope of the appended claims.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Though embodiments have been described with reference to certain versions thereof; however, other versions are possible. Therefore, the spirit and scope of the embodiments should not be limited to the description of the preferred versions contained herein.

What is claimed is:

1. A method comprising:
obtaining, by an electronic device, at least one item data, wherein the at least one item data comprises (i) at least one explicit feedback to a user interaction event and (ii) historical advertisement data comprising one or more bid requests;
identifying, by the electronic device, at least one external data source;
aligning, by the electronic device, the at least one item data to the at least one external data source based on at least one contextual data, creating pairs of aligned data, wherein for each of the pairs of the aligned data, aligning the at least one item data comprises:
computing a weighted linear combination of a temporal interest of a user and a previous temporal interest of the user; and
passing the weighted linear combination as an input to a next cell of an interaction model;
generating, by the electronic device, an aggregate result based on passing the weighted linear combinations through a series of cells of the interaction model; and
generating, by the electronic device using the interaction model, a user response prediction for the user and another interaction event.

2. The method of claim 1, further comprising:
obtaining, by the electronic device, at least one user feature and at least one item feature; and
identifying, by the electronic device, at least one user dynamic feature of the at least one user feature and at least one item dynamic feature of the at least one item feature.

3. The method of claim 2, further comprising:
applying, by the electronic device, a first feedforward neural network to the at least one user dynamic feature; and
applying, by the electronic device, a second feedforward neural network to the at least one item dynamic feature.

4. The method of claim 2, further comprising:
obtaining, by the electronic device, the at least one user dynamic feature and the at least one item dynamic feature;
determining, by the electronic device, an aggregate result of the at least one user dynamic feature based on historical data associated with the at least one user dynamic feature; and
determining, by the electronic device, an aggregate result of the at least one item dynamic feature based on historical data associated with the at least one item dynamic feature.

5. The method of claim 1, wherein the item data further comprises:
historical user data comprising a series of user activities with a temporal dependency,
wherein the user interaction event further comprises an interaction result in response to a user interaction with an advertisement, and
wherein the user response prediction further comprises predicting in real-time, by the electronic device, a click-through rate for the user in response to an incoming advertisement bid request.

6. The method of claim 1 further comprising:
in response to receiving an advertisement bid request from an ad exchange server, determining, by the electronic device, at least one predicted click through rate value;
computing, by the electronic device, at least one bid price based on the predicted click through rate value;
determining, by the electronic device, a winning advertisement; and
outputting, by the electronic device, the winning advertisement.

7. An electronic device comprising:
at least one memory; and
at least one processor operatively coupled to the at least one memory, the at least one processor configured to:
obtain at least one item data, wherein the at least one item data comprises (i) at least one explicit feedback to a user interaction event and (ii) historical advertisement data comprising one or more bid requests;
identify at least one external data source;
align the at least one item data to the at least one external data source based on at least one contextual data, creating pairs of aligned data, wherein for each of the pairs of the aligned data, the at least one processor is configured to:
compute a weighted linear combination of a temporal interest of a user and a previous temporal interest of the user; and
pass the weighted linear combination as an input to a next cell of an interaction model;
generate an aggregate result based on passing the weighted linear combinations through a series of cells of the interaction model; and
generate, using the interaction model, a user response prediction for the user and another interaction event.

8. The electronic device of claim 7, wherein the at least one processor is further configured to:
obtain at least one user feature and at least one item feature; and
identify at least one user dynamic feature of the at least one user feature and at least one item dynamic feature of the at least one item feature.

9. The electronic device of claim 8, wherein the at least one processor is further configured to:
apply a first feedforward neural network to the at least one user dynamic feature; and
apply a second feedforward neural network to the at least one item dynamic feature.

10. The electronic device of claim 8, wherein the at least one processor is further configured to:
obtain the at least one user dynamic feature and the at least one item dynamic feature;
determine an aggregate result of the at least one user dynamic feature based on historical data associated with the at least one user dynamic feature; and
determine an aggregate result of the at least one item dynamic feature based on historical data associated with the at least one item dynamic feature.

11. The electronic device of claim 7, wherein the item data further comprises:
historical user data comprising a series of user activities with a temporal dependency,
wherein the user interaction event further comprises an interaction result in response to a user interaction with an advertisement, and
wherein the user response prediction further comprises predicting in real-time, by the electronic device, a click-through rate for the user in response to an incoming advertisement bid request.

12. The electronic device of claim 7, wherein the at least one processor is further configured to:
in response to receiving an advertisement bid request from an ad exchange server, determine at least one predicted click through rate value;
compute at least one bid price based on the predicted click through rate value;
determine a winning advertisement; and
output the winning advertisement.

13. A non-transitory machine-readable medium comprising instructions that, when executed by at least one processor of an electronic device, cause the at least one processor to:
obtain at least one item data, wherein the at least one item data comprises (i) at least one explicit feedback to a user interaction event and (ii) historical advertisement data comprising one or more bid requests;
identify at least one external data source;
align the at least one item data to the at least one external data source based on at least one contextual data, creating pairs of aligned data, wherein for each of the pairs of the aligned data, the at least one processor is configured to:
compute a weighted linear combination of a temporal interest of a user and a previous temporal interest of the user; and
pass the weighted linear combination as an input to a next cell of an interaction model;
generate an aggregate result based on passing the weighted linear combinations through a series of cells of the interaction model; and
generate, using the interaction model, a user response prediction for the user and another interaction event.

14. The non-transitory machine-readable medium of claim 13, wherein the instructions are further configured to cause the at least one processor to:
obtain at least one user feature and at least one item feature; and
identify at least one user dynamic feature of the at least one user feature and at least one item dynamic feature of the at least one item feature.

15. The non-transitory machine-readable medium of claim 14, wherein the instructions are further configured to cause the at least one processor to:
apply a first feedforward neural network to the at least one user dynamic feature; and
apply a second feedforward neural network to the at least one item dynamic feature.

16. The non-transitory machine-readable medium of claim 13, wherein the item data further comprises:
historical user data comprising a series of user activities with a temporal dependency,
wherein the user interaction event further comprises an interaction result in response to a user interaction with an advertisement, and
wherein the user response prediction further comprises predicting in real-time, by the electronic device, a click-through rate for the user in response to an incoming advertisement bid request.

17. The non-transitory machine-readable medium of claim 13, wherein the instructions are further configured to cause the at least one processor to:
in response to receiving an advertisement bid request from an ad exchange server, determine at least one predicted click through rate value;
compute at least one bid price based on the predicted click through rate value;
determine a winning advertisement; and
output the winning advertisement.

18. The method of claim 1, wherein the interaction model comprises at least one of: a long-short term memory (LSTM) model and a contextual long-short term memory (CLSTM) model.

19. The electronic device of claim 7, wherein the interaction model comprises at least one of: a long-short term memory (LSTM) model and a contextual long-short term memory (CLSTM) model.

20. The non-transitory machine-readable medium of claim 13, wherein the interaction model comprises at least one of: a long-short term memory (LSTM) model and a contextual long-short term memory (CLSTM) model.

* * * * *